United States Patent [19]

Funae et al.

[11] Patent Number: 5,447,790
[45] Date of Patent: Sep. 5, 1995

[54] MAGNETIC RECORDING MEDIUM HAVING A FIBROUS SUBSTRATE, A STYRENE-BUTADIENE UNDERLAYER, AND A MAGNETIC LAYER ON A FIRST SIDE AND AN IMAGE RECORDING LAYER ON THE SECOND SIDE

[75] Inventors: Haruyoshi Funae, Takasago; Sadao Kinugasa, Kakogawa; Hideo Makishima, Takasago; Hideaki Senoh, Tokyo, all of Japan

[73] Assignee: Mitsubishi Paper Mills Limited, Japan

[21] Appl. No.: 168,397

[22] Filed: Dec. 17, 1993

Related U.S. Application Data

[63] Continuation of Ser. No. 671,440, Mar. 19, 1991, abandoned.

[30] Foreign Application Priority Data

Mar. 23, 1990 [JP] Japan ................................. 2-74243
Jun. 11, 1990 [JP] Japan ................................. 2-151843

[51] Int. Cl.$^6$ .............................................. G11B 5/00
[52] U.S. Cl. .................................. 428/323; 428/537.5; 428/694 B; 428/694 BS; 428/694 BB; 428/694 ST; 428/900; 430/60; 430/69; 503/204; 503/226; 283/82; 360/2
[58] Field of Search ................. 428/694, 900, 694 BS, 428/694 ST, 694 BB, 694 B, 694 R, 537.5, 323; 503/204, 226; 360/2; 283/82; 430/60, 69

[56] References Cited

U.S. PATENT DOCUMENTS

| | | | |
|---|---|---|---|
| 3,975,569 | 8/1976 | Sugimatsu et al. | 428/329 |
| 4,663,209 | 5/1987 | Aonuma et al. | 428/141 |
| 4,686,149 | 8/1987 | Aonuma et al. | 428/522 |
| 4,824,824 | 4/1989 | Matsushita et al. | 503/204 |
| 4,855,282 | 8/1989 | Satomura et al. | 503/218 |

FOREIGN PATENT DOCUMENTS

| | | |
|---|---|---|
| 0291315 | 11/1988 | European Pat. Off. . |
| 58-35730 | 3/1983 | Japan . |
| 58-38733 | 3/1983 | Japan . |
| 58-54085 | 3/1983 | Japan . |
| 58104959 | 6/1986 | Japan . |
| 63-144086 | 6/1988 | Japan . |
| 64-50974 | 3/1989 | Japan . |

*Primary Examiner*—Stevan A. Resan
*Attorney, Agent, or Firm*—Cushman Darby & Cushman

[57] ABSTRACT

There is discloses a magnetic recording sheet comprising a substrate, a magnetic recording layer formed on one side of the substrate, an image recording layer formed on the other side of the substrate, a first subbing layer formed between the substrate at the magnetic recording layer, and preferably, a second subbing layer formed between the substrate and the image recording layer, said magnetic recording layer comprising a magnetic powder and an aqueous binder, said image recording layer comprising a binder, and said first and second subbing layers comprising a styrene-butadiene latex having a gel content of 5 to 75%. This magnetic recording sheet can be obtained without any trouble in its production process and is excellent in dimensional stability, magnetic recording properties, image-recording properties, etc.

9 Claims, No Drawings

MAGNETIC RECORDING MEDIUM HAVING A FIBROUS SUBSTRATE, A STYRENE-BUTADIENE UNDERLAYER, AND A MAGNETIC LAYER ON A FIRST SIDE AND AN IMAGE RECORDING LAYER ON THE SECOND SIDE

This is a continuation of application Ser. No. 07/671,440, filed on Mar. 19, 1991, which was abandoned upon the filing hereof 08/168,397 filed Dec. 17, 1993.

BACKGROUND OF THE INVENTION

The present invention relates to a magnetic recording sheet used in tickets such as railroad tickets, coupon tickets and commutation tickets; prepaid cards; and the like. More particularly, the present invention relates to a magnetic recording sheet which can be obtained without any trouble in its production process and is excellent in dimensional stability, magnetic recording characteristics, image-recording characteristics, etc.

In recent years, automation of selling and inspection of tickets such as railroad tickets, coupon tickets and commutation tickets has been in progress. In addition, prepaid cards are rapidly coming into wide use in the payment of public-telephone charges, highway charges, etc.

In such tickets and prepaid cards, there is generally used a magnetic recording sheet comprising a substrate and a magnetic recording layer formed on one side of the substrate.

The magnetic recording side of the magnetic recording sheet has a dark color such as dark brown or black due to a magnetic material. Therefore, an image recording layer is formed on the side reverse to the magnetic recording side in order to record a necessary image in the magnetic recording sheet. As the image recording layer, there are used a heat-sensitive recording layer, a thermal transfer ink receiving layer, an ink-jet receiving layer, an ink-print receiving layer, an impact type printing receiving layer, a dielectric recording layer, an electrophotographic recording layer, etc.

As the substrate, fibrous substrates such as paper and nonwoven fabric are mainly used. Such fibrous substrates, however, have a very uneven surface and hence the thickness of the magnetic recording layer formed thereon tends to be nonuniform. Therefore, the magnetic recording characteristics of the magnetic recording sheet thus obtained become nonuniform particularly concerning magnetic signal output, resulting in the so-called "drop-out" phenomenon.

In order to make the thickness of such a magnetic recording layer uniform and improve the dimensional stability of the magnetic recording sheet, it has been proposed to form a subbing layer between the substrate and the magnetic recording layer (Japanese Patent Unexamined Publication No. 58-3573 and Japanese Utility Model Registration Unexamined Publication No. 64-50974).

However, in a process of forming the subbing layer on the fibrous substrate at first and then the magnetic recording layer and the image recording layer, the internal stress is increased by evaporation of water contained in the substrate in coating and drying steps for forming each layer, so that after drying, wrinkles are apt to be formed on the surface of a coating layer to make the surface uneven. The later these steps are carried out in the process, the more serious this problem becomes.

As a method for recording an image on the magnetic recording sheet, there are employed thermal recording methods, electrophotographic recording methods, electrostatic recording methods, etc., as described above. As a system used in the thermal recording methods, there can be exemplified a binary color-producing system using a diazo or chelate type dye precursor and an acidic substance. A thermal recording method using the binary color-producing system is advantageous for reducing the cost and simplifying and miniaturizing a recording apparatus, as compared with other recording methods and thermal recording methods using other systems, and hence it has come into wide use.

However, an image formed by the thermal recording method using the binary color-producing system is not sufficient in chemical resistance. Therefore, for example, when a coupon ticket, a commutation ticket or the like, which has been obtained by this method is stored in a container such as a purse or commuter pass holder, the image causes discoloration due to a plasticizer (e.g. dioctyl phthalate or dioctyl adipate) contained in a material constituting the container.

For preventing the discoloration, a protective layer comprising a water-soluble polymeric compound, an organic-solvent-soluble resin or the like is formed on the image recording layer. However, when such a protective layer is formed, the difference between the heat shrinkage percentages on the image recording side and the magnetic recording side becomes considerably large. Therefore, the curling of the magnetic recording sheet becomes serious, so that the running properties thereof in a recording apparatus and a reading apparatus are deteriorated.

As the substrate, fibrous sheets such as paper are widely used as described above because they are not expensive as compared with plastic sheets such as polyethylene terephthalate sheets and polyvinyl chloride sheets. When such a fibrous sheet is used as the substrate, the resulting magnetic recording sheet changes considerably in dimensions with humidity, resulting in especially serious curling.

For solving such a problem, there has been proposed a process which comprises forming a polyolefin resin layer on each side of a substrate, and then forming a magnetic recording layer on one side and an image recording layer on the other side (Japanese Utility Model Registration Unexamined Publication No. 64-50974). However, when the polyolefin resin layers are thus formed, the above-mentioned formation of wrinkles in drying and coating steps in the process becomes more remarkable.

SUMMARY OF THE INVENTION

It is an object of the present invention to obtain a magnetic recording sheet which can be produced without such problems in its production process and is excellent in dimensional stability, magnetic recording characteristics, image-recording characteristics, etc.

The present inventors have earnestly investigated for achieving this object. Consequently, the present inventors have found that the object can be achieved by forming a specific subbing layer on at least one side of a substrate, whereby the present invention has been accomplished.

That is, according to the present invention, there is provided a magnetic recording sheet comprising a substrate, a magnetic recording layer formed on one side of the substrate, an image recording layer formed on the other sides of the substrate, and a first subbing layer formed between the substrate and the magnetic recording layer, said magnetic recording layer comprising a magnetic powder and an aqueous binder, said image recording layer containing a binder, and said first subbing layer comprising a styrene-butadiene latex having a gel content of 5 to 75%.

DETAILED DESCRIPTION OF THE INVENTION

The magnetic recording sheet of the present invention comprises a substrate, a magnetic recording layer, an image recording layer, a first subbing layer between the substrate and the magnetic recording layer, and preferably a second subbing layer between the substrate and the image recording layer. If necessary, a protective layer is formed on the magnetic recording layer and further on the image recording layer as well.

The above layers are explained below in detail.

The subbing layer is formed by coating a composition comprising a styrene-butadiene latex having a gel content of 5 to 75%, preferably 5 to 65%, on at least one side of the substrate. When the gel content exceeds 75%, wrinkles formed during drying, i.e., the unevenness of surface of the resulting coating layer, become remarkable. When it is less than 5%, the strength of the coating layer is lowered, so that a trouble tends to be caused during the production process of the magnetic recording sheet and its use.

In the present invention, the formation of at least the first subbing layer is an essential condition. The further formation of the second subbing layer is preferable because it further improves the image-recording characteristics and the resistance to curling.

The first and second subbing layers may contain white pigments such as calcium carbonate, kaolin, calcined kaolin, talc, silica, urea resins, polystyrenes, etc. in addition to the styrene-butadiene latex. The content of the white pigments is preferably 30% by weight or less based on the weight of each subbing layer. When the image recording layer is a heat-sensitive recording layer, the second subbing layer preferably contain pigments having a large oil absorption, in an amount of up to 70 or 80% by weight based on the weight of the second subbing layer in order to improve heat-sensitive recording characteristics.

The first and second subbing layers may further contain water-holding agents such as starches, cellulose derivatives, acrylic resins, etc.; organic or inorganic peroxides; synthetic resins such as phenolic resins, amino resins, etc.; and crosslinking agents such as aldehyde compounds, epoxy compounds, boric acid, phosphor-containing compounds, zirconium-containing compounds, silane compounds, etc.

The thickness of each of the first and second subbing layers is preferably 3 to 15 μm.

When the image recording layer is a heat-sensitive recording layer, a third subbing layer comprising a latex and a pigment as its main constituents may, if necessary, be formed between the heat-sensitive recording layer and the second subbing layer. The gel content of this latex is also preferably 5 to 75%, more preferably 5 to 65%.

The magnetic recording layer is formed by dispersing a magnetic powder uniformly in a solvent (e.g. water) together with a binder such as a polyester resin, vinyl chloride resin, polyurethane resin, vinyl chloridevinyl acetate copolymer resin, styrene-butadiene copolymer resin, polyacrylate resin, epoxy resin or the like, optionally adding thereto a plasticizer, rubber, dispersing agent, antistatic agent, pigment, etc., and coating or printing the resulting coating composition on the first subbing layer. Also in the magnetic recording layer, a styrene-butadiene latex having a gel content of 5 to 75% is preferably used as the binder.

As the magnetic powder, there can be used $\gamma$-$Fe_2O_3$, $Fe_3O_4$, mixed crystal of $\gamma$-$Fe_2O_2$ and $Fe_2O_4$, Co-containing $\gamma$-$Fe_2O_3$, Co-containing $Fe_2O_4$, Ba ferrite, Sr ferrite, etc. For preventing erasion of magnetically recorded information by a common permanent magnet, there can be advantageously used Ba ferrite, Sr ferrite and the like which have a coercive force of 1500 to 5000 oersteds.

A protective layer of a nitrocellulose, a polyurethane resin, a polyvinyl alcohol or the like is coated or printed on the magnetic recording layer in some cases. In the protective layer, a binder having a gel content of 5 to 75% is preferably used.

As the image recording layer formed in the present invention, there can be exemplified a heat-sensitive recording layer, a thermal ink-transfer receiving layer, an ink-jet receiving layer, an ink-print receiving layer, a dot-print receiving layer, an electrostatic recording layer, and an electrophotographic recording layer.

Of these, the heat-sensitive recording layer and the thermal ink-transfer receiving layer are leading image recording layers at present. The ink-jet receiving layer and the ink-print receiving layer are formed in some cases.

The heat-sensitive recording layer preferably comprises a colorless or light-colored dye precursor and an acidic substance as color-developing components. On heating, these color-developing components react with each other to develop a color. As the dye precursor, the following compounds can be exemplified:

(1) Crystal violet lactone,
(2) 3-Indolino-3-p-dimethylaminophenyl-6-dimethylaminophthalide,
(3) 3-Diethylamino-7-chlorofluoran,
(4) 3-Diethylamino-7-cyclohexylaminofluoran,
(5) 3-Diethylamino-5-methyl-7-t-butylfluoran,
(6) 3-Diethylamino-6-methyl-7-anilinofluoran,
(7) 3-Diethylamino-6-methyl-7-p-butylanilinofluoran,
(8) 2-(N-phenyl-n-ethyl)aminofluoran,
(9) 3-Diethylamino-7-dibenzylaminofluoran,
(10) 3-Cyclohexylamino-6-chlorofluoran,
(11) 3-Diethylamino-6-methyl-7-xylidinofluoran,
(12) 2-Anilino-3-methyl-6-(N-ethyl-p-toluidino)fluoran,
(13) 3-Pyrrolidino-6-methyl-7-anilinofluoran,
(14) 3-Pyrrolidino-7-cyclohexylaminofluoran,
(15) 3-Piperidino-6-methyl-7-toluidinofluoran,
(16) 3-Piperidino-6-methyl-7-anilinofluoran,
(17) 3-(N-methylcyclohexylamino)-6-methyl-7-anilinofluoran,
(18) 3-Diethylamino-7-(m-trifluoromethylanilino)-fluoran,
(19) 3-Diethylamino-6-methyl-7-chlorofluoran,
(20) 3-Dibutylamino-6-methyl-7-anilinofluoran.

Typical examples of the acidic substance used in the heat-sensitive layer are given below.

(21) 4,4'-Isopropylidenediphenol,
(22) 4,4'-Isopropylidenebis(2-chlorophenol),
(23) 4,4'-Isopropylidenebis(2-tert-butylphenol),

(24) 4,4'-sec-Butylidenediphenol,
(25) 4,4'-(1-Methyl-n-hexylidene)diphenol,
(26) 4-Phenylphenol,
(27) 4-Hydroxydiphenoxide,
(28) Methyl-4-hydroxybenzoate,
(29) Phenyl-4-hydroxybenzoate,
(30) 4-Hydroxyacetophenone,
(31) Salicylic acid anilide,
(32) 4,4'-Cyclohexylidenediphenol,
(33) 4,4'-Cyclohexylidenebis(2-methylphenol),
(34) 4,4'-Benzylidenediphenol,
(35) 4,4'-Thiobis(6-tert-butyl-3-methylphenol),
(36) 4,4'-Isopropylidenebis(2-methylphenol),
(37) 4,4'-Ethylenebis(2-methylphenol),
(38) 4,4'-Cyclohexylidenebis(2-isopropylphenol),
(39) 2,2'-Dihydroxydiphenyl,
(40) 2,2'-Methylenebis(4-chlorophenol),
(41) 2,2'-Methylenebis(4-methyl-6-tert-butylphenol),
(42) 1,1'-Bis(4-hydroxyphenol)-cyclohexane,
(43) 2,2'-Bis(4'-hydroxyphenyl)propane,
(44) Novolak type phenolic resin,
(45) Halogenated novolak type phenolic resin,
(46) α-Naphthol,
(47) β-Naphthol,
(48) 3,5-Di-tert-butylsalicyclic acid,
(49) 3,5-Di-α-methylbenzylsalicyclic acid,
(50) 3-Methyl-5-tert-butylsalicyclic acid,
(51) phthalic acid monoanilide paraethoxybenzoic acid,
(52) Bis(4-hydroxyphenyl)sulfone,
(53) 4-Hydroxy-4'-isopropyloxydiphenylsulfone,
(54) Bis(3-allyl-4-hydroxyphenyl)sulfone,
(55) p-Benzyloxybenzoic acid,
(56) Benzyl p-hydroxybenzoate.

A coating composition for the heat-sensitive recording layer can be obtained, for example, by the following method. A dye precursor and an acidic substance are ground to fine particles by means of a grinding mill separately or together and dispersed in a medium (e.g. water), after which the dispersion is mixed with a binder, a pigment and the like, and if necessary, various additives are added, whereby the coating composition is prepared.

As the binder, there can be used, for example, starches; water-soluble binders such as hydroxyethyl celluloses, methyl celluloses, polyvinyl alcohols, styrene-maleic anhydride copolymers, styrene-butadiene copolymers, polyacrylamides, carboxymethyl celluloses, gum arabic, caseins, etc.; and latices such as styrene-butadiene latices, etc.

The pigment includes diatomaceous earth, talc, kaolin, calcined kaolin, calcium carbonate, magnesium carbonate, titanium oxide, zinc oxide, silicon oxide, aluminum hydroxide, urea-formaldehyde resins, etc.

In addition, there can be used, for example, higher fatty acid matal salts such as zinc stearate, calcium stearate and the like; waxes such as paraffins, paraffin oxides, polyethylenes, polyethylene oxides and the like; wetting agents such as dioctylsulfosuccinic acid salts and the like; ultraviolet absorbers of benzophenone type, benzotriazole type and the like; surfactants; and fluorescent dyes.

When a protective layer is formed on the heat-sensitive recording layer, it preferably comprises a water-soluble resin, for preventing development of a color by the reaction of the protective layer with the dye precursor. The water-soluble resin includes, for example, polyvinyl alcohols, polyvinyl pyrrolidones, polyacrylamides, carboxymethyl celluloses, hydroxyethyl celluloses, and modified products thereof.

As the substrate, fibrous substrates such as paper, nonwoven fabric and the like are preferably used, though synthetic papers, plastic films, metal foils and the like can also be used singly or in the form of a composite sheet thereof.

As other heat-sensitive recording layers, there can be exemplified heat-sensitive recording layers comprising an imino compound and an isocyanate compound, for example, those disclosed in Japanese Patent Unexamined Publication Nos. 58-38733, 58-54085 and 58-104959. On heating, these compounds react with each other to form a stable compound, so that an image excellent in fade resistance can be obtained. There can also be used, for example, chelate type heat-sensitive recording systems utilizing the reaction with heating of ferric stearate with tannic acid, gallic acid or the like, and diazo type heat-sensitive recording systems utilizing the reaction of a diazonium salt with a coupler. In the above systems, there can be used the same pigments, binders and the like as in the above-mentioned heat-sensitive recording layer formed by the use of a dye precursor and an acidic substance.

When the image recording layer is a thermal ink-transfer receiving layer, the thermal ink-transfer receiving layer is required to permit sufficient transfer of thermal-transfer ink and have a property of absorbing the thermal-transfer ink into the inner part of the layer easily.

The thermal ink-transfer receiving layer comprises a pigment and a binder as its main constituents and optionally additives.

As the pigment, those used commonly in coated papers can be used, though there can be preferably used pigments having an oil absorption of 30–200 ml/100 g as measured in accordance with JIS-K5101. The pigment includes, for example, inorganic pigments such as natural or synthetic zeolites, kaolin, talc, pagodite, diatomaceous earth, synthetic silica, clay, calcined kaolin, calcium carbonate, magnesium silicate, titanium oxide, barium carbonate, aluminum hydroxide, etc.; and organic pigments such as urea-formaldehyde fillers, etc.

The binder includes styrene-butadiene latices, ethylene-vinyl acetate latices, acrylic latices, hydroxyethyl celluloses, carboxymethyl celluloses, caseins, polyvinyl alcohols, starches, etc.

As the additives, there can be used pigment dispersants, defoaming agents, lubricants, dyes, fluorescent whitening agents, ultraviolet absorbers, water-proofing agents, antiseptics, etc.

For the thermal ink-transfer receiving layer, the amount of coating is preferably 3 to 30 g/m$^2$. When it is less than 3 g/m$^2$, no sufficient ink transfer can be attained. When it is more than 30 g/m$^2$, the cost is raised, and the amount of water or a solvent evaporated is increased, resulting in low coating workability and drying workability.

On the other hand, an ink-jet recording method comprises spattering fine drops of ink by any of various operating principles, adhering the same to the receptive surface of paper or the like, and thereby conducting recording. An ink-jet receiving layer is formed on the surface of a substrate such as paper in order to improve dot diameter, dot shape, printing density, and color tone reproducibility. The ink-jet receiving layer comprises a pigment and a binder as its main constituents. As the pigment and the binder, there can be used the same materials as for the thermal ink-transfer receiving layer. For the ink-jet receiving layer, the amount of coating is preferably 2 to 30 g/m². When it is less than 2 g/m², the ink receptivity and the dot reproducibility are deteriorated. When it is more than 30 g/m², the cost is increased and the coating workability and the drying workability are deteriorated.

In an ink-print receiving layer, there can be used pigments, binders, dispersants, defoaming agents and the like, which have heretofore been used in common art papers and coated papers. Specifically, as the pigments, there can be used kaolin, clay, talc, calcium carbonate, silica, etc. As the binders, there can be used synthetic binders such as styrene-butadiene latices, acrylic latices, polyvinyl alcohol resins, etc., and natural binders such as starches, caseins, cellulose derivatives, etc. The amount of coating is approximately 1–20 g/m². It is usually 3–13 g/m².

In the present invention, as an apparatus for forming the subbing layer(s), the magnetic recording layer, the protective layer, and the image recording layer such as the heat-sensitive recording layer, there can be used an air knife coater, gravure coater, roll coater, rod coater, curtain coater, blade coater, die coater, etc. In addition, for forming the subbing layer(s), there can be used a size press and a gate roll coater which are used in a paper making process. There can be employed printing methods such as offset printing, silk screen printing, etc.

Furthermore, for improving the smoothness of the surface of a coating, there can be utilized treatments using a machine calender, supercalender, gloss calender, blushing, etc.

In the present invention, by forming a subbing layer comprising a styrene-butadiene latex having a gel content of 5 to 75% and a magnetic recording layer thereon on at least one side of a substrate and an image recording layer on the other side, there can be obtained a recording sheet which can be produced without formation of wrinkles in its production process, and bas no roughness of a coated surface, an excellent dimensional stability, satisfactory running properties in a recording apparatus and a reading apparatus, and improved magnetic characteristics and image-recording properties due to the prevention of penetration of components in the magnetic recording layer and/or the image recording layer into the substrate by the subbing layer(s).

The gel content in the present specification is measured according to the following method.

A latex composition is formed into a latex film with drying at room temperature. The latex film is placed in benzene about 200 times as much as the film and allowed to stand for 48 hours to be dissolved. The resulting solution is filtered through filter paper (#2) and the filtrate is dried at 70° C., after which the weight of the residue is measured. The measured value is taken as the sol weight in the latex film and the gel content is calculated according to the following equation:

$$\text{Gel content (\%)} = \left(1 - \frac{\text{Sol weight in a latex film}}{\text{Total weight of the latex film}}\right) \times 100$$

DESCRIPTION OF PREFERRED EMBODIMENTS

The present invention is illustrated in detail with the following specific examples, which should not be construed as limiting the scope of the invention. In the examples, parts and percents are all by weight.

In the production of a magnetic recording sheet, the same conditions of coating step, drying step and the like were employed in all the examples.

EXAMPLES 1 AND 2

(1) Formation of subbing layer(s)

A styrene-butadiene latex having a gel content of 28% (T-2028, mfd. by Japan Synthetic Rubber Co., Ltd.) was coated on one side of paper having a basis weight of 160 g/m², in an amount of 5 g/m² in terms of solids and dried at 105° C. to obtain support A. The same styrene-butadiene latex (T-2028) was coated on a piece of support A on the side reverse to the latex coating layer in an amount of 5 g/m² in terms of solids and dried to obtain support B.

(2) Formation of magnetic recording layer

The following ingredients were dispersed in a ball mill to prepare a coating composition for a magnetic recording layer.

| | |
|---|---|
| Ba-ferrite (coercive force: 2700 Oe) | 100 parts |
| Styrene-butadiene latex (T-2028) | 30 parts |
| Water | 200 parts |

The coating composition for magnetic recording layer was coated on the subbing layer composed of the latex of another piece of support A in an amount of 30 g/m² in terms of solids, subjected to a magnetic field to effect orientation, and then dried at 105° C. to obtain a magnetic-layer-coated sheet A.

The coating composition for magnetic recording layer was coated on the subbing layer composed of the latex on one side of the support B in an amount of 30 g/m² in terms of solids, subjected to a magnetic field to effect orientation, and then dried at 105° C. to obtain a magnetic-layer-coated sheet B.

A coating composition for heat-sensitive recording layer was prepared in the following manner.

| | |
|---|---|
| Composition 1 | |
| 3-Dibutylamino-6-methyl-7-anilinofluoran | 12 parts |
| 10% Aqueous polyvinyl alcohol solution | 18 parts |
| | (solids: 1.8 parts) |
| Water | 30 parts |
| Composition 2 | |
| 4,4'-Isopropylidenediphenol | 40 parts |
| p-Benzylbiphenyl | 40 parts |
| Zinc stearate | 20 parts |
| 10% Aqueous polyvinyl alcohol solution | 50 parts |
| | (solids: 5 parts) |
| Water | 100 parts |

Compositions 1 and 2 were individually subjected to dispersion by means of a sand grinder until the average particle size became about 2 μm. Then, the coating composition for heat-sensitive recording layer was prepared according to the following formulation.

| | |
|---|---|
| Calcium carbonate (Brt-15, mfd. by Shiraishi Kogyo K.K.) | 8 parts |
| Composition 1 | 12 parts |
| 10% Aqueous polyvinyl alcohol solution | 40 parts |
| | (solids: 4 parts) |
| Composition 2 | 30 parts |

(3) Formation of heat-sensitive recording layer

The coating composition for a heat-sensitive recording layer was coated on the magnetic-layer-coated sheet A on the side reverse to the magnetic layer in an amount of 5 g/m² in terms of solids and dried at 50° C. Then, supercalendering was conducted to obtain a magnetic recording sheet of Example 1.

The coating composition for heat-sensitive recording layer was coated on the magnetic-layer-coated sheet B on the side reverse to the magnetic layer in an amount of 5 g/m² in terms of solids and dried at 50° C. Then, supercalendering was conducted to obtain a magnetic recording sheet of Example 2.

EXAMPLES 3 AND 4

An aqueous polyvinyl alcohol solution was coated on the magnetic recording layer of each of the same magnetic-layer-coated sheets A and B as in Examples 1 and 2 in an amount of 3 g/m² in terms of solids and dried at 105° C. Then, a heat-sensitive recording layer was formed on each sheet in the same manner as in Examples 1 and 2 and dried at 50° C., followed by supercalendering. Thus, recording sheets of Examples 3 and 4 were obtained from the sheets A and B, respectively.

EXAMPLES 5 AND 6

Magnetic recording sheets of Examples 5 and 6 were obtained by repeating the processes of Examples 3 and 4, respectively, except that after the formation of the heat-sensitive recording layer, an aqueous polyvinyl alcohol solution was further coated on the heat-sensitive recording layer in an amount of 3 g/m² in terms of solids and dried at 50° C., followed by supercalendering.

EXAMPLES 7 AND 8

Magnetic recording sheets of Examples 7 and 8 were obtained by repeating the processes of Examples 1 and 2, respectively, except that a styrene-butadiene latex having a gel content of 8% (P8702, mfd. by Sumitomo Naugatuck Co., Ltd.) in place of the styrene-butadiene latex having a gel content of 28% used in Examples 1 and 2.

EXAMPLE 9

A magnetic recording sheet was obtained by repeating the process of Example 1, except that a styrene-butadiene latex having a gel content of 70% (L-1235, mfd. by Asahi Chemical Industry Co.) was used in place of the styrene-butadiene latex having a gel content of 28% used in Example 1.

COMPARATIVE EXAMPLES 1 AND 2

Magnetic recording sheets of Comparative Examples 1 and 2 were obtained by repeating the processes of Examples 1 and 2, respectively, except that a styrene-butadiene latex having a gel content of 85% (SNX-4270, mfd. by Sumitomo Naugatuck Co., Ltd.) was used in place of the styrene-butadiene latex having a gel content of 28% used in Examples 1 and 2.

COMPARATIVE EXAMPLES 3 AND 4

Magnetic recording sheets of Comparative Examples 3 and 4 were obtained by repeating the processes of Examples 3 and 4, respectively, except that the styrene-butadiene latex having a gel content of 85% (SNX-4270, mfd. by Sumitomo Naugatuck Co., Ltd.) was used in place of the styrene-butadiene latex having a gel content of 28% used in Examples 3 and 4.

EXAMPLE 10

A thermal ink-transfer receiving layer having the composition shown below was coated on the same magnetic-layer-coated sheet A as in Example 1 on the side reverse to the magnetic layer in an amount of 10 g/m² in terms of solids and dried at 105° C.

| | |
|---|---|
| Synthetic silica | 100 parts |
| Sodium pyrophosphate | 0.3 part |
| Polyvinyl alcohol | 20 parts |
| Ethylene-vinyl acetate latex | 20 parts |
| Water | 300 parts |

Subsequently, supercalendering was conducted to obtain a magnetic recording sheet.

EXAMPLE 11

A magnetic recording sheet was obtained by repeating the process of Example 10, except that the same magnetic-layer-coated sheet B as in Example 2 was used in place of the magnetic-layer-coated sheet A used in Example 10.

EXAMPLES 12 AND 13

Magnetic recording sheets of Examples 12 and 13 were obtained by repeating the processes of Examples 3 and 4, respectively, except that the same thermal ink-transfer receiving layer as in Example 10 was coated in an amount of 10 g/m² in terms of solids in place of the heat-sensitive layer coated in Examples 3 and 4, and then dried at 105° C., followed by supercalendering.

EXAMPLE 14

A magnetic recording sheet was obtained by repeating the process of Example 10, except that the styrene-butadiene latex having a gel content of 70% (L-1235, mfd. by Asahi Chemical industry Co.) was used in place of the styrene-butadiene latex having a gel content of 28% used in Example 10.

COMPARATIVE EXAMPLE 5

A magnetic recording sheet was obtained by repeating the process of Example 10, except that the styrene-butadiene latex having a gel content of 85% (SNX-4270, mfd. by Sumitomo Naugatuck Co., Ltd.) was used in place of the styrene-butadiene latex having a gel content of 28% used in Example 10.

COMPARATIVE EXAMPLES 6 AND 7

Magnetic recording sheets of Comparative Examples 6 and 7 were obtained by repeating the processes of Examples 12 and 13, respectively, except that the styrene-butadiene latex having a gel content of 85% (SNX-4270, mfd. by Sumitomo Naugatuck Co., Ltd.) was used in place of the styrene-butadiene latex having a gel content of 28% used in Examples 12 and 13.

EXAMPLE 15

An ink-jet receiving layer having the composition shown below was formed on the same magnetic-layer-coated sheet A as in Example 1 on the side reverse to the magnetic layer in an amount of 10 g/m$^2$ in terms of solids and dried at 105° C. Then, supercalendering was conducted to obtain a magnetic recording sheet.

| | |
|---|---|
| Synthetic silica | 100 parts |
| Polyvinyl alcohol (polymerization degree: 1700, completely saponified) | 20 parts |
| Polyacylamide (molecular weight: 200,000) | 20 parts |
| Water | 300 parts |

EXAMPLES 16 and 17

Magnetic recording sheets of Examples 16 and 17 were obtained by repeating the processes of Examples 3 and 4, respectively, except that the same ink-jet receiving layer as in Example 15 was formed in an amount of 10 g/m$^2$ in terms of solids in place of the heat-sensitive recording layer formed in Examples 3 and 4, and then dried at 105° C., followed by supercalendering.

EXAMPLE 18

A magnetic recording sheet was obtained by repeating the process of Example 15, except that the styrene-butadiene latex having a gel content of 70% (L-1235, mfd. by Asahi Chemical Industry Co.) was used in place of the styrene-butadiene latex having a gel content of 28% used in Example 15.

COMPARATIVE EXAMPLE 8

A magnetic recording sheet was obtained by repeating the process of Example 15, except that the styrene-butadiene latex having a gel content of 85% (SNX-4270, mfd. by Sumitomo Naugatuck Co., Ltd.) was used in place of the styrene-butadiene latex having a gel content of 28% used in Example 15.

COMPARATIVE EXAMPLES 9 AND 10

Magnetic recording sheets of Comparative Examples 9 and 10 were obtained by repeating the processes of Examples 16 and 17, respectively, except that the styrene-butadiene latex having a gel content of 85% (SNX-4270, mfd. by Sumitomo Naugatuck Co., Ltd.) was used in place of the styrene-butadiene latex having a gel content of 28% used in Examples 16 and 17.

EXAMPLE 19

An ink-print receiving layer having a composition shown below was coated on the same magnetic-layer-coated sheet A as in Example 1 on the side reverse to the magnetic layer in an amount of 10 g/m$^2$ in terms of solids and dried at 105° C. Then, supercalendering was conducted to obtain a magnetic recording sheet.

| | |
|---|---|
| Kaolin (Ultracoat, mfd. by Engelhard) | 100 parts |
| Acrylic dispersant (Aron T-40, mfd. by Toagosei Chemical Industry Co., Ltd.) | 0.5 part |
| Styrene-butadiene latex (JSR-0691D, mfd. by Japan Synthetic Rubber Co., Ltd.) | 20 parts |
| Phosphorice-esterified starch (MS4600, mfd. by Nihon Shokuhin Kako K.K.) | 10 parts |
| Water | 100 parts |

EXAMPLES 20 AND 21

Magnetic recording sheets of Examples 20 and 21 were obtained by repeating the processes of Examples 3 and 4, respectively, except that the same ink-print receiving layer as in Example 19 was formed in an amount of 10 g/m$^2$ in terms of solids in place of the heat-sensitive recording layer formed in Examples 3 and 4, and then dried at 105° C., followed by supercalendering.

EXAMPLE 22

A magnetic recording sheet was obtained by repeating the process of Example 19, except that the styrene-butadiene latex having a gel content of 70% (L-1235, mfd. by Asahi Chemical Industry Co.) was used in place of the styrene-butadiene latex having a gel content of 28% used in Example 19.

COMPARATIVE EXAMPLE 11

A magnetic recording sheet was obtained by repeating the process of Example 19, except that the styrene-butadiene latex having a gel content of 85% (SNX-4270, mfd. by Sumitomo Naugatuck Co., Ltd.) was used in place of the styrene-butadiene latex having a gel content of 28% used in Example 19.

COMPARATIVE EXAMPLES 12 AND 13

Magnetic recording sheets of Comparative Examples 12 and 13 were obtained by repeating the processes of Examples 20 and 21, respectively, except that the styrene-butadiene latex having a gel content of 85% (SNX-4270, mfd. by Sumitomo Naugatuck Co., Ltd.) was used in place of the styrene-butadiene latex having a gel content of 28% used in Examples 20 and 21.

COMPARATIVE EXAMPLE 14

The same magnetic recording layer as in Example 1 was directly formed on base paper having a basis weight of 160 g/m$^2$ without forming a subbing layer. Thereafter, the paper was treated in the same manner as in Example 1 to obtain a magentic recording sheet.

EXAMPLE 23

A magnetic recording sheet was obtained by repeating the process of Example 1, except that SNX-4270 (gel content: 85%) was used in place of the styrene-butadiene latex T2028 (gel content: 28%) used in the magnetic recording layer in Example 1.

EXAMPLE 24

A protective layer of polyvinyl alcohol was formed on the heat-sensitive recording layer of the same magnetic recording sheet (before supercalendering) as obtained in Example 2, in the same manner as in Example 6. Then, supercalendering was conducted to obtain a magnetic recording sheet.

EXAMPLE 25

A polyurethane resin was coated on the magnetic recording layer of the same magnetic recording sheet (before supercalendering) as obtained in Example 2, in an amount of 2 g/m$^2$ in terms of solids and dried to form a protective layer on the magnetic recording layer. Then, a polyvinyl alcohol layer was formed on the heat-sensitive recording layer in the same manner as in Example 5, followed by supercalendering, whereby a desired magnetic recording sheet was obtained.

EXAMPLE 26

A protective layer of polyvinyl alcohol was formed on the heat-sensitive recording layer of the same magnetic recording sheet (before supercalendering) as obtained in Example 8, in the same manner as in Example 6. Then, supercalendering was conducted to obtain a desired magnetic recording sheet.

EXAMPLE 27

A magnetic recording layer and a heat-sensitive recording layer were formed in the same manner as in Example 2, except that a styrene-butadiene latex having a gel content of 60% (L-1462, mfd. by Asahi Chemical Industry Co.) was used in place of the styrene-butadiene latex having a gel content of 28% used in Example 2. Then, a protective layer of polyvinyl alcohol was formed on the heat-sensitive recording layer in the same manner as in Example 6, followed by supercalendering, whereby a desired magnetic recording layer was obtained.

EXAMPLE 28

A magnetic recording sheet was obtained by repeating the process of Example 2, except that a styrene-butadiene latex having a gel content of 75% (L-1225, mfd. by Asahi Chemical Industry Co.) was used in place of the styrene-butadiene latex having a gel content of 28% used in Example 2.

EXAMPLE 29

A protective layer of polyvinyl alcohol was formed on the heat-sensitive recording layer of the same magnetic recording sheet (before supercalendering) as obtained in Example 28, in the same manner as in Example 6 to obtain a desired magnetic recording sheet.

The magnetic recording sheets obtained in the above Examples and Comparative Examples were evaluated by the following methods.

[Rectangularity ratio]

Saturation flux density Bm and residual flux density Br in the direction of orientation of a magnetic recording layer were measured by means of a B-H curve tracer. The ratio Br/Bm was calculated and defined as rectangularity ratio. The higher the rectangularity ratio, the better the dispersion of magnetic powder and the better the magnetic recording properties.

[The optical density of the printed portion of a heat-sensitive recording layer]

Printing was conducted on a heat-sensitive recording layer by means of a thermal stamp tester (mfd. by Toyoseiki Seisakusho Co., Ltd.) at a temperature of 120° C. and at a pressure of 1 kg/cm² for a contact time of 3 sec. The density of developed color in the printed portion was measured by means of a Macbeth densitometer. The higher the optical density, the better the image-recording properties.

The image quality of a thermal ink-transfer receiving layer]

Thermal transfer ink was transferred from an ink sheet to the thermal ink-transfer receiving layer of a magnetic recording sheet by means of a commercially available hot-melt transfer printer. The quality of the image thus obtained was visually evaluated in 3 grades. The rating (mark) shown in Table 1 was as follows:

◯: Substantially no blur was observed. Excellent image quality.

Δ: A slight blur was observed. Acceptable for practical use.

X: A considerable blur was observed. Unacceptable for practical use.

The image quality of an ink-jet receiving layer]

Printing was conducted on the ink-jet receiving layer of a magnetic recording sheet in black ink by means of a commercially available ink-jet printer (A-1210, mfd. by Cannon Inc.). The quality of the image thus obtained was visually evaluated. The rating (mark) shown in Table 1 was as follows:

◯: Excellent.

Δ: Acceptable for practical use.

X: Inferior.

The image quality of an ink-print receiving layer]

Printing was conducted on the ink-print receiving layer of a magnetic recording sheet in black ink by means of a commercially available offset duplicator. The quality of the image thus obtained was visually evaluated. The rating (mark) shown in Table 1 was as follows:

◯: Excellent.

Δ: Acceptable for practical use.

X: Inferior.

[Dimensional stability]

Each magnetic recording sheet was cut into pieces having the same size as that of a prepaid card for telephone (54 mm×86 mm). The pieces were allowed to stand at 20° C. and 85% RH for 24 hours, after which their dimensions $l_1$ were measured. Then, they were allowed to stand at 20° C. and 85% RH for 24 hours, followed by measurement of their dimensions $l_2$. The elongation percentage e was calculated according to the following equation:

$$e\,(\%) = \frac{l_1 - l_2}{l_1} \times 100$$

[Surface unevenness]

The surface unevenness of a magnetic recording layer and an image recording layer before supercalendering was evaluated. The rating (mark) shown in Tables 1 and 2 was as follows:

◯: Substantially no unevenness was observed.

Δ: Slight unevenness was observed.

X: Considerable unevenness was observed.

◯-Δ: Intermediate between ◯ and Δ.

[Curling]

Each sheet was cut into pieces having the same size as that of a prepaid card for telephone (54 mm×86 mm). The pieces were allowed to stand on a flat plate in circumstances of 20° C. and 65% RH for 3 hours. Then, the distance between the edge of the piece and the flat plate was measured.

The results of the above evaluation are shown in Tables 1 and 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Gel content (%) of latex in first subbing layer | 28 | 28 | 28 | 28 | 28 | 28 | 8 | 8 | 70 |
| Protective layer on magnetic recording layer | None | None | Formed | Formed | Formed | Formed | None | None | None |
| Kind of image recording layer | Heat-sensitive recording layer | Heat-sensitive recording layer | Heat-sensitive recording layer | Heat-sensitive recording layer | Heat-sensitive recording layer | Heat-sensitive recording layer | Heat-sensitive recording layer | Heat-sensitive recording layer | Heat-sensitive recording layer |
| Gel content (%) of latex in second subbing layer | — | 28 | — | 28 | — | 28 | — | 8 | — |
| Protective layer on image recording layer | None | None | None | None | Formed | Formed | None | None | None |
| Rectangularity ratio (Br/Bm) | 0.86 | 0.86 | 0.85 | 0.84 | 0.85 | 0.84 | 0.87 | 0.86 | 0.85 |
| Printing density of heat-sensitive recording layer | 1.28 | 1.30 | 1.27 | 1.31 | 1.28 | 1.30 | 1.27 | 1.29 | 1.28 |
| Image quality of thermal ink-transfer receiving layer |  |  |  |  |  |  |  |  |  |
| Image quality of ink-jet receiving layer |  |  |  |  |  |  |  |  |  |
| Image quality of ink-print receiving layer |  |  |  |  |  |  |  |  |  |
| Dimensional stability (elongation, %) |  |  |  |  |  |  |  |  |  |
| Length | 0.1 | 0.1 | 0.1 | 0.1 | 0.1 | 0.1 | 0.1 | 0.1 | 0.1 |
| Breadth | 0.5 | 0.3 | 0.4 | 0.3 | 0.5 | 0.3 | 0.5 | 0.3 | 0.5 |
| Surface unevenness | ○ | ○ | ○ | ○ | ○ | ○ | ○ | ○ | ○ |

|  | Comparative Example 1 | Comparative Example 2 | Comparative Example 3 | Comparative Example 4 | Comparative Example 14 | Example 10 | Example 11 | Example 12 |
|---|---|---|---|---|---|---|---|---|
| Gel content (%) of latex in first subbing layer | 85 | 85 | 85 | 85 | — | 28 | 28 | 28 |
| Protective layer on magnetic recording layer | None | None | Formed | Formed | None | None | None | Formed |
| Kind of image recording layer | Heat-sensitive recording layer | Heat-sensitive recording layer | Heat-sensitive recording layer | Heat-sensitive recording layer | Heat-sensitive recording layer | Thermal ink-transfer receiving layer | Thermal ink-transfer receiving layer | Thermal ink-transfer receiving layer |
| Gel content (%) of latex in second subbing layer | — | 85 | — | 85 | — | — | 28 | — |
| Protective layer on image recording layer | None | None | None | None | None | None | None | None |
| Rectangularity ratio (Br/Bm) | 0.84 | 0.85 | 0.84 | 0.83 | 0.76 | 0.86 | 0.85 | 0.85 |
| Printing density of heat-sensitive recording layer | 1.23 | 1.24 | 1.22 | 1.23 | 1.22 |  |  |  |
| Image quality of thermal ink-transfer receiving layer |  |  |  |  |  | ○ | ○ | ○ |
| Image quality of ink-jet receiving layer |  |  |  |  |  |  |  |  |
| Image quality of ink-print receiving layer |  |  |  |  |  |  |  |  |
| Dimensional stability (elongation, %) |  |  |  |  |  |  |  |  |
| Length | 0.1 | 0.1 | 0.1 | 0.1 | 0.8 | 0.1 | 0.1 | 0.1 |
| Breadth | 0.4 | 0.3 | 0.4 | 0.3 | 1.2 | 0.5 | 0.3 | 0.4 |
| Surface unevenness | Δ | X | X | X | Δ | ○ | ○ | ○ |

|  | Example 13 | Example 14 | Comparative Example 5 | Comparative Example 6 | Comparative Example 7 | Example 15 | Example 16 |
|---|---|---|---|---|---|---|---|
| Gel content (%) of latex in first subbing layer | 28 | 70 | 85 | 85 | 85 | 28 | 28 |
| Protective layer on magnetic recording layer | Formed | None | None | Formed | Formed | None | Formed |
| Kind of image recording layer | Thermal ink-transfer receiving layer | Thermal ink-transfer receiving layer | Thermal ink-transfer receiving layer | Thermal ink-transfer receiving layer | Ink-jet receiving layer | Ink-jet receiving layer |  |
| Gel content (%) of latex in second subbing layer | 28 | — | — | — | 85 | — | — |
| Protective layer on image recording layer | None | None | None | None | None | None | None |
| Rectangularity ratio (Br/Bm) | 0.84 | 0.85 | 0.84 | 0.84 | 0.85 | 0.86 | 0.85 |
| Printing density of heat-sensitive recording layer |  |  |  |  |  |  |  |
| Image quality of thermal ink-transfer receiving layer | ○ | ○ | Δ | X | X |  |  |
| Image quality of ink-jet |  |  |  |  |  | ○ | ○ |

TABLE 1-continued

| | | | | | | | | |
|---|---|---|---|---|---|---|---|---|
| receiving layer | | | | | | | | |
| Image quality of ink-print receiving layer | | | | | | | | |
| Dimensional stability (elongation, %) | | | | | | | | |
| Length | 0.1 | 0.1 | 0.1 | 0.1 | 0.1 | 0.1 | 0.1 | |
| Breadth | 0.3 | 0.4 | 0.5 | 0.4 | 0.4 | 0.5 | 0.4 | |
| Surface unevenness | ○ | ○ | Δ | X | X | ○ | ○ | |

| | Example | | Comparative Example | | | Example | | | |
|---|---|---|---|---|---|---|---|---|---|
| | 17 | 18 | 8 | 9 | 10 | 19 | 20 | 21 | 22 |
| Gel content (%) of latex in first subbing layer | 28 | 70 | 85 | 85 | 85 | 28 | 28 | 28 | 70 |
| Protective layer on magnetic recording layer | Formed | None | None | Formed | Formed | None | Formed | Formed | None |
| Kind of image recording layer | Ink-jet receiving layer | Ink-jet receiving layer | Ink-jet receiving layer | Ink-jet receiving layer | Ink-jet receiving layer | Ink-print receiving layer | Ink-print receiving layer | Ink-print receiving layer | Ink-print receiving layer |
| Gel content (%) of latex in second subbing layer | 28 | — | — | — | 28 | — | — | 28 | — |
| Protective layer on image recording layer | None | None | None | None | None | None | None | None | None |
| Rectangularity ratio (Br/Bm) | 0.84 | 0.86 | 0.85 | 0.84 | 0.84 | 0.86 | 0.85 | 0.84 | 0.84 |
| Printing density of heat-sensitive recording layer | | | | | | | | | |
| Image quality of thermal ink-transfer receiving layer | | | | | | | | | |
| Image quality of ink-jet receiving layer | ○ | ○ | Δ | X | X | | | | |
| Image quality of ink-print receiving layer | | | | | | ○ | ○ | ○ | ○ |
| Dimensional stability (elongation, %) | | | | | | | | | |
| Length | 0.1 | 0.1 | 0.1 | 0.1 | 0.1 | 0.1 | 0.1 | 0.1 | 0.1 |
| Breadth | 0.4 | 0.5 | 0.5 | 0.4 | 0.4 | 0.5 | 0.4 | 0.4 | 0.5 |
| Surface unevenness | ○ | ○ | Δ | X | X | ○ | ○ | ○ | ○ |

| | Comparative Example | | | Example |
|---|---|---|---|---|
| | 11 | 12 | 13 | 23 |
| Gel content (%) of latex in first subbing layer | 85 | 85 | 85 | 28 |
| Protective layer on magnetic recording layer | None | Formed | Formed | None |
| Kind of image recording layer | Ink-print receiving layer | Ink-print receiving layer | Ink-print receiving layer | Heat-sensitive recording layer |
| Gel content (%) of latex in second subbing layer | — | — | 28 | — |
| Protective layer on image recording layer | None | None | None | None |
| Rectangularity ratio (Br/Bm) | 0.85 | 0.84 | 0.84 | 0.84 |
| Printing density of heat-sensitive recording layer | | | | 1.26 |
| Image quality of thermal ink-transfer receiving layer | | | | |
| Image quality of ink-jet receiving layer | | | | |
| Image quality of ink-print receiving layer | Δ | X | X | |
| Dimensional stability (elongation, %) | | | | |
| Length | 0.1 | 0.1 | 0.1 | 0.1 |
| Breadth | 0.5 | 0.4 | 0.4 | 0.5 |
| Surface unevenness | Δ | X | X | ○-66 |

*Only in Example 23, a latex having a gel content of 85% was used as a binder in a magnetic recording layer. In the other Examples and Comparative Examples, a latex having a gel content of 28% was used.

TABLE 2

| | Example | | | | | | | Comparative Example |
|---|---|---|---|---|---|---|---|---|
| | 2 | 24 | 25 | 26 | 27 | 28 | 29 | 14 |
| Gel content of latex in subbing layer | 28% | 28% | 28% | 8% | 60% | 75% | 75% | — |
| Protective layer on magnetic recording layer | None | None | Formed | None | None | None | None | None |
| Protective layer on heat-sensitive recording layer | None | Formed | Formed | Formed | Formed | None | Formed | None |
| Rectangulating ratio | 0.86 | 0.86 | 0.85 | 0.87 | 0.86 | 0.85 | 0.86 | 0.76 |
| Printing density | 1.30 | 1.22 | 1.20 | 1.25 | 1.22 | 1.14 | 1.11 | 1.10 |
| Carling | 2 mm | 3 mm | 2 mm | 3 mm | 3 mm | 2 mm | 3 mm | 11 mm |
| Dimensional Stability (elongation percentage) | | | | | | | | |
| Length | 0.1% | 0.1% | 0.1% | 0.1% | 0.1% | 0.1% | 0.1% | 0.8% |
| Breadth | 0.4% | 0.5% | 0.2% | 0.4% | 0.3% | 0.4% | 0.3% | 1.2% |
| Surface unevenness | ○ | ○ | ○ | ○ | ○ | Δ | Δ | Δ |

As is clear from the results shown in Tables 1 and 2, the magnetic recording sheets of Examples 1 to 29 are satisfactory in dimensional stability and excellent in magnetic recording characteristics, image-recording characteristics, etc.

What is claimed is:

1. A magnetic recording sheet comprising:
   a hydrophilic fibrous substrate having first and second sides;
   a first subbing layer disposed on the first side of the substrate, said first subbing layer including a dried styrene-butadiene latex wherein a gel content of said latex is 5-75%;
   a magnetic recording layer disposed on said first subbing layer, said magnetic recording layer including a magnetic powder and an aqueous binder; and
   an image recording layer disposed on the second side of said substrate, said image recording layer including a binder, said image recording layer being selected from the group consisting of a heat sensitive recording layer, a thermal ink-transfer receiving layer, an ink-jet receiving layer, a dot-print receiving layer, an electrostatic recording layer and an electrophotographic recording layer.

2. A magnetic recording sheet according to claim 1, which further comprises a second subbing layer comprising a styrene-butadiene latex having a gel content of 5 to 75% between the substrate and the image recording layer.

3. A magnetic recording sheet according to claim 1, wherein the gel content of the latex in the first subbing layer is 5 to 65%.

4. A magnetic recording sheet according to claim 2, wherein the gel content of the latex in each of the first and second subbing layers is 5 to 65%.

5. A magnetic recording sheet according to claim 1, wherein the binder in the magnetic recording layer is a styrene-butadiene latex having a gel content of 5 to 75%.

6. A magnetic recording sheet according to claim 1, wherein a protective layer is formed on the magnetic recording layer or the image recording layer.

7. A magnetic recording sheet according to claim 1, wherein the image recording layer is a heat-sensitive recording layer.

8. A magnetic recording sheet according to claim 7, wherein the heat-sensitive recording layer comprises a dye precursor and an acidic substance as color-producing components.

9. A magnetic recording sheet comprising:
   a hydrophilic fibrous substrate having first and second sides;
   a first subbing layer disposed on the first side of the substrate, said first subbing layer including a dried styrene-butadiene latex wherein a gel content of said latex is 5-75%;
   a magnetic recording layer disposed on said first subbing layer, said magnetic recording layer including a magnetic powder and an aqueous binder; and
   a heat sensitive recording layer disposed on the second side of said substrate, said heat-sensitive recording layer including a dye precursor, an acidic substance and an aqueous binder.

* * * * *